United States Patent
Campbell et al.

(10) Patent No.: US 6,187,376 B1
(45) Date of Patent: Feb. 13, 2001

(54) METHOD FOR IMPROVING THE ADHESION OF A REPAIR COATING TO A PREVIOUSLY COATED SUBSTRATE

(75) Inventors: Donald H. Campbell, Hartland; Michael A. Gessner, West Bloomfield, both of MI (US)

(73) Assignee: BASF Corporation, Southfield, MI (US)

( * ) Notice: Under 35 U.S.C. 154(b), the term of this patent shall be extended for 0 days.

(21) Appl. No.: 09/165,147

(22) Filed: Oct. 1, 1998

(51) Int. Cl.$^7$ ........................................................ B05D 7/14
(52) U.S. Cl. ........................ 427/142; 427/410; 427/419.8
(58) Field of Search ..................... 427/140, 142, 427/419.1, 419.8, 407.1, 409, 410

(56) References Cited

U.S. PATENT DOCUMENTS

| | | | | |
|---|---|---|---|---|
| 3,642,571 | * | 2/1972 | Sprenger | 260/239 E |
| 4,165,412 | * | 8/1979 | Bechara et al. | 521/121 |
| 4,435,526 | * | 3/1984 | Wooler | 521/107 |
| 4,555,535 | * | 11/1985 | Bednarek et al. | 524/40 |
| 4,656,202 | * | 4/1987 | Nason et al. | 522/89 |
| 5,169,723 | * | 12/1992 | Forster | 427/142 |
| 5,244,696 | * | 9/1993 | Hazan et al. | 427/402 |
| 5,312,886 | * | 5/1994 | House et al. | 528/64 |
| 5,370,939 | * | 12/1994 | Williams et al. | 428/482 |
| 5,453,295 | * | 9/1995 | Sammel et al. | 427/410 |
| 5,474,811 | | 12/1995 | Rehfuss et al. | 427/407.1 |
| 5,547,757 | * | 8/1996 | Swarup et al. | 427/410 |
| 5,552,497 | * | 9/1996 | Taylor et al. | 525/456 |
| 5,719,251 | * | 2/1998 | Wilczek et al. | 427/387 |
| 5,726,254 | | 3/1998 | Wu et al. | 525/375 |
| 5,744,528 | * | 4/1998 | Callinan et al. | 427/341 |
| 5,789,513 | * | 8/1998 | Kirchner | 525/7 |
| 5,807,921 | * | 9/1998 | Hill et al. | 524/837 |
| 5,854,385 | * | 12/1998 | McGee et al. | 528/369 |
| 5,976,615 | * | 11/1999 | Menovcik et al. | 427/142 |

FOREIGN PATENT DOCUMENTS

| | | |
|---|---|---|
| 0 604 922 A1 | 12/1993 | (EP) . |
| 0 738 739 A1 | 4/1996 | (EP) . |
| 0 890 576 A2 | 6/1998 | (EP) . |

OTHER PUBLICATIONS

IN–5255 European Search Report, EP 99 11 8098, dated Jan. 24, 2000.

* cited by examiner

*Primary Examiner*—Erma Cameron
(74) *Attorney, Agent, or Firm*—Mary E. Golota

(57) ABSTRACT

The invention provides a method for improving the adhesion of a repair coating to a coated substrate. It requires that at least one coating composition be applied to a substrate, the coating composition having (a) a film forming component with (i) a crosslinking component comprising one or more aminoplast resins, and (ii) one or more polymers having one or more functional groups which are reactive with the crosslinking component, (b) an adhesion improving additive comprising one or more compounds containing Sn(IV), (c) a catalyst for promoting a reaction between crosslinking agent (i) and one or more polymers (ii). The at least one coating composition is cured to provide a coated substrate and one or more repair coatings are applied to the coated substrate. In a preferred aspect of the invention, the one or more repair coatings applied are the same as the at least one coating composition. In a preferred aspect of the invention the at least one coating composition of the invention further comprises (d) an adhesion promoting component consisting of (i) an epoxy group containing component, and (ii) a monofunctional carboxy group component.

16 Claims, No Drawings

METHOD FOR IMPROVING THE ADHESION OF A REPAIR COATING TO A PREVIOUSLY COATED SUBSTRATE

FIELD OF THE INVENTION

The present invention relates to a method for improving the adhesion of a repair coating to a coated substrate, especially a substrate coated with a composite color-plus-clear coating. Coating compositions for use in the claimed method and coated articles resulting therefrom are also provided.

BACKGROUND AND SUMMARY OF THE INVENTION

Substrates are coated for a wide variety of reasons. Coatings may be applied to protect the underlying substrate from weathering effects and/or to provide a pleasing visual appearance. Dual-purpose coatings are particularly common in the automotive industry where excellent weatherability, durability and appearance are minimum requirements for original equipment coatings applied in the assembly plant by the automotive manufacturer. Many types of coatings and coating systems have been developed in an attempt to satisfy the requirements of the automotive industry.

Composite color-plus-clear coatings are widely utilized in the coatings art. They are particularly desirable where exceptional gloss, depth of color, distinctness of image, or special metallic effects are required. The automotive industry has made extensive use of color-plus-clear composite coatings for automotive body panels.

As used herein, the term "composite color-plus-clear" relates to composite coating systems requiring the application of a first coating, typically a colored basecoat coating, followed by the application of a second coating, generally a clearcoat, over the noncured or "wet" first coating. The applied first and second coatings are then cured. Thus, such systems are often described as "wet on wet" or "two-coat/one bake". Drying processes that fall short of complete cure may be used between the application of the coatings.

Clearcoats used in color-plus-clear systems must have an extremely high degree of clarity in order to achieve the desired visual effects. High gloss coatings also require a low degree of visual aberrations at the surface in order to achieve the desired visual effect such as high distinctness of image (DOI). As a result, clearcoats of color-plus-clear systems are especially susceptible to the phenomenon known as environmental etch, i.e., spots or marks on or in the clear finish that often cannot be rubbed out.

Many compositions have been proposed for use as the clearcoat of a color-plus-clear composite coating. However, prior art clearcoat coatings often suffer from disadvantages such as inferior coatability, compatibility problems with the colored basecoat, solubility problems, lack of adhesion to the underlying basecoat, lack of adhesion to repair coatings applied to the color-plus-clear composite coating subsequent to the cure of the clearcoat, and/or insufficient resistance to environmental etch.

Clearcoat coating compositions exhibiting many advantages over prior art compositions, especially with respect to environmental etch, were disclosed in U.S. Pat. Nos. 5,474,811 and 5,356,669. The disclosed clear coating compositions comprise a first component comprising a polymer backbone having appended thereto at least one carbamate functional group, and a second component comprising a compound having a plurality of functional groups that are reactive with said carbamate groups.

However, despite the foregoing improvements, certain of the aforementioned problems remain. In particular, some composite coatings exhibit an inferior degree of adhesion to repair coatings applied subsequent to cure of the composite coating. Inferior or inadequate adhesion of repair coatings to the composite coating is a separate and distinct problem from delamination of the overall composite coating to the underlying substrate.

The type of repair coating and method used to repair a defect in a finished surface typically depends upon when and how the defect occurred.

Defects and/or imperfections that occur during the application and/or cure of the composite coating are corrected via "in-line" repair processes. In-line repair processes normally involve the application of one or more additional layers of the composite coating to the surface of one or more previously applied and cured layers of the composite coating. The additional layers are cured in a manner identical to the previously applied and cured layers. Multiple passes of the defect containing cured-coated product through the composite coating application line and oven system accomplish this type of repair. It will be appreciated that the repair coating in this instance is the composite coating itself or the components thereof. Repair may be done on the basecoat component, the topcoat component, or the combination thereof, i.e., the color-plus-clear composite coating. In any case, in-line repair is done with the application of a coating that is identical to the coating layer or layers to be repaired. No sanding or surface preparation is permitted prior to the application of the additonal composite coating layers or components thereof. The "repair coating", i.e., the composite coating, must exhibit excellent adhesion to the previously applied and cured composite coating layers without any sanding or preparation of the previously applied and cured layers.

Defects and/or imperfections which result from product manufacturing processes are addressed with "end of line" repair processes. End of line repair processes typically occur after the addition of product components having melting and/or deformation temperatures lower than the bake temperature of the color-plus-clear composite coating. Thus, a repair coating having a cure temperature lower than the lowest component deformation temperature is employed. As a result, end of line repair coatings have cure temperatures significantly lower than those of composite coatings. Some sanding and/or surface preparation may be allowed prior to the application of the end of line repair coating.

Finally, "refinish" repair processes are used to rectify defects that occur after the product leaves the manufacturing facility. Refinish products are typically applied after substantial sanding of the surface to be repaired. Refinish coatings typically cure at temperatures less than those of color-plus-clear composite coatings but are designed to provide optimum performance benefits. Such coatings may be expensive and require specialized application equipment.

Manufacturers of composite coatings are particularly concerned with the requirements of in-line repair processes. Improvements in in-line repair coating adhesion must be provided in conjunction with required performance properties of the composite coating such as appearance, durability, and etch resistance among others.

It is desirable to provide a method to improve the adhesion of repair coatings applied to a previously coated substrate in an in-line repair process. Such a method would provide quality, appearance and cost advantages. It would also be advantageous to provide a composite coating which provides desirable performance properties but is also capable of performing as a repair coating for use in in-line repair processes without sanding or surface preparation of the defect-containing coated substrate.

The present invention achieves these and other objectives. The instant invention is directed toward a method to improve the adhesion of a repair coating applied to a previously coated substrate in an in-line repair process. The invention further provides coating compositions for use in the claimed method and coated articles resulting therefrom are also provided.

The method of the invention for improving the adhesion of a repair coating to a coated substrate requires that at least one coating composition be applied to a substrate wherein the coating composition comprises (a) a film forming component comprising (i) a crosslinking component comprising one or more aminoplast resins, and (ii) one or more polymers having one or more functional groups which are reactive with the crosslinking component, (b) an adhesion improving additive comprising one or more compounds containing Sn(IV), (c) a catalyst for promoting a reaction between crosslinking agent (i) and one or more polymers (ii). The at least one coating composition is cured to provide a coated substrate and one or more repair coatings are applied to the coated substrate. In a preferred aspect of the invention, the one or more repair coatings applied are the same as the at least one coating composition.

The coating composition of the invention having improved adhesion to repair coatings requires (a) a film-forming component consisting of (i) a crosslinking component consisting of one or more aminoplast resins, and (ii) one or more polymers having one or more functional groups which are reactive with the one or more aminoplast resins, (b) an adhesion improving additive comprising one or more compounds containing Sn(IV), and (c) a catalyst for promoting a reaction between the one or more aminoplast resins (i) and one or more polymers (ii), the catalyst comprising one or more acidic compounds which are at least partially blocked. In a preferred aspect of the invention the composition further comprises (d) an adhesion promoting component consisting of (i) an epoxy group containing component, and (ii) a monofunctional carboxy group component.

Finally the invention provides a coated article comprising an article having a substrate with a cured coating thereon, the cured coating comprising the result of curing the at least one coating composition of the invention.

DETAILED DESCRIPTION OF THE INVENTION

The present invention provides a method for improving the adhesion of a repair coating to a coated substrate. The method requires that at least one coating composition be applied to a substrate wherein the coating composition comprises (a) a film forming component comprising (i) a crosslinking component comprising one or more aminoplast resins, and (ii) one or more polymers having one or more functional groups which are reactive with the crosslinking component, (b) an adhesion improving additive comprising one or more compounds containing Sn(IV), and (c) a catalyst for promoting a reaction between crosslinking agent (i) and polymer (ii). The at least one coating composition is cured to provide a coated substrate and one or more repair coatings are applied to the coated substrate.

Suitable substrates for use in the method of the invention include metal, wood, plastic, composites, alloys, and combinations thereof. Substrates commonly found in the automotive industry are preferred, especially those which are used in the production of automotive body panels. Metal, plastic, composites, alloys and combinations thereof are most preferred.

Suitable substrates may be prepared as commonly treated in the automotive industry. Substrates may be primed, phosphated, electrodeposition coated, and/or washed or prepared as desired. Washing followed by electrodeposition coating is most preferred.

The coating composition of the invention which is applied to the substrate comprises a film forming component (a), an adhesion improving additive (b) comprising one or more compounds containing Sn(IV), and a catalyst (c) for promoting a reaction between the components of the fiLm forming component (a). Film forming component (a) comprises a crosslinking component (i) comprising one or more aminoplast resins, and one or more polymers (ii) having one or more functional groups which are reactive with the crosslinking component (i).

The firm forming component (a) results in a crosslinked or network polymer when subjected to conditions sufficient to effect cure. The reactants comprising film forming component (a) are multifunctional components, such as bifunctional, trifunctional, etc. Mixtures of such mulitfunctional components, especially mixtures of bifunctional and trifunctional components, are especially preferred. Monfunctional components are not desired in film forming component (a).

Crosslinking component (i) comprises one or more aminoplast resins. Aminoplast as used herein refers to amino resins or thermosetting resins made by combining an aldehyde with a compound containing an amino ($-NH_2$) group. Illustrative amino-group containing compounds are urea, melamine, benzoguanamine, dihydroxyethylurea, acetoguanamine, acrylamide, and mixtures thereof. Preferred amino-group containing compounds are urea and melamine. Suitable amino resins may be polymeric or monomeric. They may have active methylol groups or be partially or fully alkylated with methylalkyoxy groups. Alcohols having one to six carbons are suitable for alkylation of amino resins, with methanol, isobutanol and n-butanol being preferred. Particularly preferred amino resins for use as crosslinking component (i) are the at least partially alkylated melamines. Most preferred amino resins are those which are fully alkylated, especially those having $C_{1-4}$ alkyl groups. Crosslinking component (i) will consist of one or more amino resins, including mixtures of suitable amino resins.

Film forming component (a) further comprises one or more polymers (ii). Suitable polymers (ii) include oligomeric compounds, polymeric compounds and mixtures thereof having one or more functional groups which are reactive with the amino resin of crosslinking component (i). At least two functional groups are prefered. Illustrative functional groups which are reactive with amino resins include hydroxyl, carbamate, carboxyl, and amide. Illustrative polymers having such functional groups include alkyds, polyesters, epoxies, carbamates, acrylics, vinyls and mixtures thereof.

Preferred as polymer (ii) are those compounds having two or more carbamate functional groups. Preferably, polymer (ii) comprises a compound selected from the group consisting of oligomers and polymers having appended thereto more than one carbamate group or more than one urea group, or more than one group convertible to a carbamate or urea group.

Oligomers typically have a molecular weight of between 148 and 2000, the preferred molecular weight for the oligomers is between 900 and 1092; polymers typically have a molecular weight of between 2,000 and 20,000, the preferred molecular weight for the polymers is between 4000 and 6000. Mixtures of said oligomers and polymers may be used as polymer (ii). Molecular weight can be determined by the GPC method using a polystyrene standard. The carbamate or urea content of the polymer, on a molecular weight per equivalent of carbamate or urea functionality, will generally be between 200 and 1200, and preferably between 300 and 800.

Carbamate groups can generally be characterized by the formula

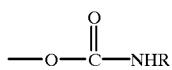

wherein R is H or alkyl, preferably of 1 to 4 carbon atoms. Preferably, R is H or methyl, and more preferably R is H. Urea groups can generally be characterized by the formula

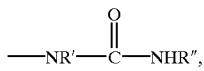

wherein R' and R" each independently represent H or alkyl, preferably of 1 to 4 carbon atoms, or R' and R" may together form a heterocyclic ring structure (e.g. where R' and R" form an ethylene bridge).

Groups that can be converted to carbamate include cyclic carbonate groups, epoxy groups, and unsaturated bonds. Cyclic carbonate groups can be converted to carbamate groups by reaction with ammonia or a primary amine, which ring-opens the cyclic carbonate to form a β-hydroxy carbamate. Epoxy groups can be converted to carbamate groups by first converting to a cyclic carbonate group by reaction with $CO_2$. This can be done at any pressure from atmospheric up to supercritical $CO_2$ pressures, but is preferably under elevated pressure (e.g. 60–150 psi). The temperature for this reaction is preferably 60–150° C. Useful catalysts include any that activate an oxirane ring, such as tertiary amine or quaternary salts (e.g. tetramethyl ammonium bromide), combinations of complex organotin halides and alkyl phosphonium halides (e.g., $((CH)_3SnI$, $BU_4SnI$, $Bu_4PI$, and $(CH_3)_4PI)$, potassium salts (e.g., $K_2CO_3$, KI), preferably in combination with crown ethers, tin octoate, calcium octoate, and the like. The cyclic carbonate group can then be converted to a carbamate group as described above. Any unsaturated bond can be converted to carbamate groups by first reacting with peroxide to convert to an epoxy group, then with $CO_2$ to form a cyclic carbonate, and then with ammonia or a primary amine to form the carbamate.

Oligomeric compounds useful as polymer (ii), and having more than one carbamate functional group, have the general formula

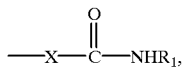

wherein X is O, S or NH, $R_1$ is H or alkyl of 1 to 4 carbon atoms. The compounds useful as polymer (ii) according to the invention can be prepared in a variety of ways.

The carbamate can be primary, terminating in a $NH_2$ group, or secondary, terminating in an NHR group. In a preferred embodiment, the carbamate is primary.

One way to prepare oligomeric compounds useful as polymer (ii) is to react an alcohol ('alcohol' is defined herein as having one or more OH groups) with more than one urea to form a compound with carbamate groups. This reaction is accomplished by heating a mixture of the alcohol and ureas. This reaction is also performed under heat, preferably in the presence of a catalyst as is known in the art. Another technique is the reaction of an alcohol with cyanic acid to form a compound with primary carbamate groups (i.e., unsubstituted carbamates). Carbamates may also be prepared by reaction of an alcohol with phosgene and then ammonia to form a compound having primary carbamate groups, or by reaction of an alcohol with phosgene and then a primary amine to form a compound having secondary carbamate groups. Another approach is to react an isocyanate (e.g., HDI, IPDI) with a compound such as hydroxypropyl carbamate to form a carbamate-capped isocyanate derivative. Finally, carbamates can be prepared by a transcarbamylation approach where an alcohol is reacted with an alkyl carbamate (e.g., methyl carbamate, ethyl carbamate, butyl carbamate) to form a primary carbamate group-containing compound. This reaction is performed under heat, preferably in the presence of a catalyst such as an organometallic catalyst (e.g., dibutyltin dilaurate). Other techniques for preparing carbamates are also known in the art and are described, for example, in P. Adams & F. Baron, "Esters of Carbamic Acid", *Chemical Review*, v. 65, 1965.

Various alcohols can be used in the preparation of carbamate compounds useful as polymer (ii) according to the invention. They generally have from 1 to 200 carbon atoms, preferably 1–60 carbon atoms, and may be monofunctional or polyfunctional (preferably a functionality of 2 to 3), aliphatic, aromatic, or cycloaliphatic. They may contain just OH groups, or they may contain OH groups plus heteroatoms such as O, S, Si, N, P, and other groups such as ester groups, ether groups, amino groups, or unsaturated sites. Examples of useful alcohols include 1,6-hexanediol,1,2-hexanediol, 2-ethyl-1,3-hexanediol, ethyl-propyl-1,5-pentanediol, 2-methyl-2,4-pentanediol, 2,2,4-trimethyl-1,3-pentanediol, 2,4,7,9-tetramethyl-5-decyn-4,7-diol, 1,3-dihydroxyacetone dimer, 2-butene-1,4-diol, pantothenol, dimethyltartrate, pentaethylene glycol, dimethyl silyl dipropanol, and 2,2'-thiodiethanol.

Polymeric compounds suitable for use in polymer (i) are selected from the group consisting of polyester, epoxy, alkyd, urethane, acrylic, polyamide, and polysilane polymers and mixtures thereof, wherein the polymer has more than one carbamate functional group appended thereto.

In a preferred embodiment, first component (a) comprises a carbamate functional acrylic polymer represented by the randomly repeating units according to the following formula (A):

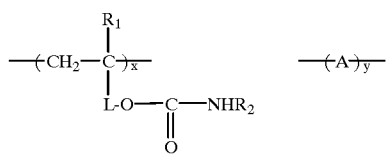

In the above formula, R represents H or $CH_3$. R' represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to photo-induced hydrolysis, and should be avoided in locations that would place the ether linkage in the crosslink matrix. The values x and y represent weight percentages, with x being 10 to 90% and preferably 20 to 50%, and y being 90 to 10% and preferably 80 to 50%.

In the formula, A represents repeat units derived from one or more ethylenically unsaturated monomers. Such monomers for copolymerization with acrylic monomers are known in the art. They include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), vinyl toluene, styrene, styrenic derivatives such as a-methyl styrene, t-butyl styrene, and the like.

L represents a divalent linking group, preferably an aliphatic of 1 to 8 carbon atoms, cycloaliphatic, or aromatic linking group of 6 to 10 carbon atoms. Examples of L include the formula (B):

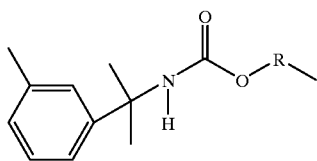

wherein R=—CH$_2$, C$_2$H$_4$, C$_3$H$_6$, C$_4$H$_8$, and the like. In one preferred embodiment, —L— is represented by —COO—L'— where L' is a divalent linking group. Thus, in a preferred embodiment of the invention, polymer (ii) is represented by randomly repeating units according to the following formula (C):

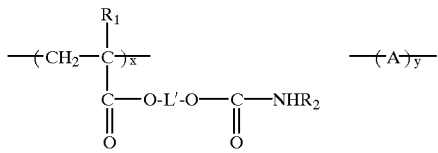

In this formula, R, R', A, x, and y are as defined above. L' may be a divalent aliphatic linking group, preferably of 1 to 8 carbon atoms, e.g., —(CH$_2$)—, —(CH$_2$)$_2$—, —(CH$_2$)$_4$—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. This carbamate functional acrylic polymer is described in U.S. Pat. No. 5,356,669, which is hereby incorporated by reference.

The polymer (ii) used in the composition of the invention can be prepared in a variety of ways. One way to prepare such polymers is to prepare an acrylic monomer having carbamate functionality in the ester portion of the monomer. Such monomers are well known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an a,b-unsaturated acid ester with a hydroxy carbamate ester to form the carbamyloxy carboxylate. Yet another technique involves formation of a hydroxyalkyl carbamate by reacting ammonia, or a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically unsaturated monomers, if desired, by techniques well known in the art.

An alternative route for preparing an acrylic polymer for use as polymer (ii) in the composition of the invention is to react an already-formed polymer such as an acrylic polymer with another component to form a carbamate-functional group appended to the polymer backbone, as described in U.S. Pat. No. 4,758,632, the disclosure of which is incorporated herein by reference. One technique for preparing such acrylic polymers involves thermally decomposing urea (to give off ammonia and HNCO) in the presence of a hydroxy-functional acrylic polymer or co-polymer to form a carbamate-functional acrylic polymer. Another technique involves reacting the hydroxyl group of a hydroxyalkyl carbamate with the isocyanate group of an isocyanate-functional acrylic or vinyl monomer to form the carbamate-functional acrylic. Isocyanate-functional acrylics are known in the art and are described, for example in U.S. Pat. No. 4,301,257, the disclosure of which is incorporated herein by reference. Isocyanate vinyl monomers are well-known in the art and include unsaturated m-tetramethyl xylene isocyanate (sold by American Cyanamid as TMI®). Yet another technique is to react the cyclic carbonate group on a cyclic carbonate-functional acrylic with ammonia in order to form the carbamate-functional acrylic. Cyclic carbonate-functional acrylic polymers are known in the art and are described, for example, in U.S. Pat. No. 2,979,514, the disclosure of which is incorporated herein by reference. A more difficult, but feasible way of preparing the polymer would be to trans-esterify an acrylate polymer with a hydroxyalkyl carbamate.

Groups capable of forming urea groups include amino groups that can be converted to urea groups by reaction with a monoisocyanate (e.g., methyl isocyanate) to form a secondary urea group or with cyanic acid (which may be formed in situ by thermal decomposition of urea) to form a primary urea group. This reaction preferably occurs in the presence of a catalyst as is known in the art. An amino group can also be reacted with phosgene and then ammonia to form a compound having primary urea group(s), or by reaction of an amino group with phosgene and then a primary amine to form a compound having secondary urea groups. Another approach is to react an isocyanate with a hydroxy urea compound to form a urea-capped isocyanate derivative. For example, one isocyanate group on toluene diisocyanate can be reacted with hydroxyethyl ethylene urea, followed by reaction of the other isocyanate group with an excess of polyol to form a hydroxy carbamate.

In addition to film forming component (a), the at least one coating composition comprises an adhesion improving additive (b) comprising one or more compounds containing Sn(IV). Compounds suitable for use as additive (b) will generally be of the formula:

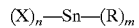

where m, n=1 to 3, m+n=4 or 5, X is an at least C$_1$ allyl group, preferably a C$_{1-16}$ alkyl group, most preferably a C4 or C8 alkyl group, R may be a conjugate base of an acid, or where polymers are formed as dicussed below, R may be

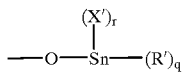

wherein q=0 to 2, r=1–3, r+q=3 or 4, X' is selected from X above, and R' is selected from X or R above, prefereably from R.

Suitable acids for use as the conjugate base of R include all compounds containing an active hydrogen including water, alcohols, acid halides, carboxylic acids, phosphoric acid, alkyl or aryl substituted mono or diacidphosphates, as well as alkyl or aryl phosphonates, aryl or alkyl substitued sulfonates, aryl or alkyl substituted sulfates. Aryl and/or alkyl substituted phosphoric and/or sulfonic acids are especially preferred.

In the case where the acid contains more than one active hydrogen, polymers can be formed. These polymers can range from 2–3 tin atoms (stannoxanes) to up to 30 tin atoms. A common example is water with a dibutyl tin which forms the dibutyltin oxide polymer. It will be appreciated that such polymers may not fit within the foregoing structures, which are intended to be idealized structures only in the case of Sn containing polymers and/or polystannoxanes.

In addition, a combination, or blend, of acids may be used in order to achieve a balance of properties.

Illustrative examples of Sn(IV) containing compounds suitable for use as additive (b) are dibutyl tin oxide (DBTO), dibutyl tin diacetate (DBTDA), stannoxane, and FC-4800, a commercially available compound from Elf Atochem of Philidelphia, Pa. However, adhesion improving additive (b) is preferably selected from the group consisting of dibutyl tin oxide and dibutyl tin diacetate. Most preferably, additive (b) is dibutyl tin diacetate.

Additive (b) will normally be used in amounts of from 0.05 to 5.0 weight percent, based on the total amount of solid clearcoat. Preferably, additive (b) will be used in an amount of from 0.1 to 2.0, and most preferably, from 0.2 to 1.0 weight percent, based on the total amount of solid clearcoat.

A catalyst (c) for promoting a reaction between crosslinking agent (i) and polymer (ii) must be used in conjunction with adhesion improving additive (b). Catalyst (c) may be selected from strong acid catalysts such as p-toluenesulfonic acid, dinonylnaphthalene disulfonic acid, dodecylbenzenesulfonic acid, phenyl acid phosphate, monobutyl maleate, butyl phosphate, and hydroxy phosphate ester.

However, catalyst (c) must be at least partially or fully blocked. Typical blocking agents are amines and epoxides. Amine blocking agents are preferred A most preferred catalyst for use as catalyst (c) is dodecylbenzenesulfonic acid blocked with an amine such as diisopropanolamine, or dimethyloxazolidine.

Catalyst (c) will normally be used in amounts of from 0.5 to 8.0 weight percent, based on the total amount of solid clearcoat. Preferably, catalyst (c) will be used in an amount of from 0.1 to 4.0, and most preferably, from 0.5 to 2.0 weight percent, based on the total amount of solid clearcoat.

Optionally, the coating composition of the invention may further comprise an adhesion promoting component (d) consisting of (i) an epoxy group containing component and (ii) a monofunctional carboxy group-containing component.

The subcomponent (i) includes one or more epoxide groups. Epoxides are well-known in the art. The epoxide may be of the general formula:

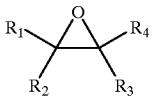

where R1, R2, R3, and R4 are each independently H (with the proviso that at least one of R1–R4 is other than H), an organic radical, which may be polymeric or non-polymeric and may contain unsaturation and/or heteroatoms, or one of R1 or R2 together with one of R3 or R4 may form a cyclic ring, which may contain unsaturation and/or heteroatoms.

Although essentially any epoxide can be used in the practice of the present invention, the epoxide is preferably substantially free of groups that are reactive with either of the two components that are reactive with one another to form urethane linkages. By 'substantially free' of such groups, it is meant that the degree of reaction between either of the two components that are reactive to form urethane linkages and any reactive component on the epoxide is sufficiently low so as to avoid any undesired adverse impact on the intercoat adhesion properties of the coating.

Useful epoxides can be prepared from alcohols, e.g., butanol, trimethylol propane, by reaction with an epihalohydrin (e.g., epichlorohydrin), or by reactio of an allyl group with peroxide. Oligomeric or polymeric polyepoxides, such as acrylic polymers or oligomers containing glycidyl methacrylate or epoxy-terminated polyglycidyl ethers such as the diglycidyl ether of bisphenol A (DGEBPA), can also be used. Epoxidized polyurethane resins or polyester resins can be prepared by reacting OH group-containing polyurethanes or polyesters, as are known in the art, with an epihalohydrin. Epoxides can also be prepared by reacting an isocyanate-terminated component such as a monomeric polyisocyanate or polymer or oligomer with glycidol. Other known polyepoxides, e.g., epoxy-novolacs, may also be used.

In one preferred embodiment, the epoxide is an acrylic-containing polymer or oligomer, preferably deriving its epoxy groups from glycidyl methacrylate monomer, glycidyl acrylate, allyl glycidyl ether, cyclohexyl monoepoxyy methacrylate, the epoxide of the dimer of cylopentadiene methacrylate, or epoxidized butadiene, more preferably glycidyl methacrylate. In another preferred embodiment, both the epoxy-containing component and one of the components that reacts to form urethane linkages are acrylic polymers or oligomers. The epoxide is preferably present in the coating composition in an amount of from 0.0001 to 0.05 equivalents of epoxy per 100 g of resin.

In a preferred embodiment, the composition of the present invention also includes a monfunctional acid group-containing component (ii), which is different from catalyst (c). Any type of monfunctional acid may be used, including Bronsted acids. Lewis acids are not preferred. Acids may be inorganic acids but organic acids are preferred. Various types of monofunctional organic acids may be used, such as phenolics, cresylics, or hydroxy acids or carboxylic acids, with carboxylic acids being preferred.

Examples of suitable monofunctional acids include octanoic acid, benzoic acid, acetic acid, hexanoic acid, or benzylic acid.

Illustrative examples of acid containing acrylics are copolymers of an ethylenically unsaturated monomer containing an acid group. The copolymers may be prepared by using conventional techniques such as free radical polymerization or anionic polymerization in, for example, a batch or semi-batch process. One or more other ethylenically unsaturated monomers that do not contain an acid group can be incorporated into the acid-containing polymer.

Examples of the ethylenically unsaturated monomers containing an acid group can be acrylic acid and methacrylic acid. Other copolymerizable monomers can be alkyl ester of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; vinyl monomers such as styrene, vinyl toluene and the like. Copolymerizable monomers containing groups which will react with the acid group under the addition reaction conditions chosen should be avoided so as to produce an ungelled product.

The acid component is preferably present in an amount of from 0 to 0.5 equivalents of acid per 100 g of resin solids, and more preferably 0.00008 to 0.008 equivalents of acid per 100 g of resin solids.

In one preferred embodiment of the invention, polymer (i) is a carbamate functional acrylic resin, and the component that includes one or more epoxy groups is an epoxy acrylic resin. Such an epoxy acrylic resin preferably includes one or more of the components lauryl methacrylate, 2-ethylhexyl acrylate, 2-ethylhexyl methacrylate, or butyl acrylate. The epoxy equivalent weight, molecular weight, and glass transition temperature of the epoxy acrylic resin are adjusted by varying the monomer lineup to optimize the performance in the particular coating composition by techniques known in the art.

A coating composition according to the present invention may be utilized, for example, in the form of substantially solid powder, or dispersion, and optionally solvent may be utilized in the composition of the present invention. It is often desirable that the composition is in a substantially liquid state, which can be accomplished with the use of a solvent. In general, depending on the solubility characteristics of component (A), the solvent can be any organic solvent and/or water. In a preferred embodiment, the solvent is a polar organic solvent. More preferably, the solvent is a polar aliphatic solvent or polar aromatic solvent. Still more preferably, the solvent is a ketone, ester, acetate, alcohol, aprotic amide, aprotic sulfoxide, or aprotic amine. Examples of useful solvents include methyl ethyl ketone, methyl isobutyl ketone, n-amyl acetate, ethylene glycol butyl ether-acetate, propylene glycol monomethyl ether acetate, xylene, n-methylpyrrolidone (NMP), isobutanol (iBuOH), methanol (MeOH), propylene carbonate (PC), or blends of aromatic hydrocarbons. Alternatively, the solvent may be water or a mixture of water with small amounts of aqueous co-solvents.

Additional ingredients may be added to the coating composition, such as, but not limited to pigments, rheology control agents, flow control additives, ultraviolet absorbers, and hindered amine light stabilizers.

In a preferred embodiment of the invention, the composition of the invention is utilized as a pigmented coating composition or clearcoat coating composition and most preferably as a clearcoat composition. In such a composition, the solvent may be present in the composition of the invention in an amount of from about 0.01 weight percent to about 99 weight percent, preferably from about 10 weight percent to about 60 weight percent, and more preferably from about 30 weight percent to about 50 weight percent.

In a particularly preferred embodiment, the composition of the invention is used as a clear and/or colorless coating composition over a pigmented basecoat as part of a composite color-plus-clear coating. Such composite coatings are popular for their depth of color and liquid glossy surface appearance. They have found particularly wide acceptance in the field of automotive coatings. The composition of the invention may also be used as the basecoat of a composite color-plus-clear coating.

Thus, in the method of the invention, the at least one coating composition of the invention may be applied as a basecoat or as a clearcoat. The repair coating may be applied as a repair to a basecoat, a clearcoat or the composite coating having both a basecoat and a clearcoat. It will be appreciated that the repair coating may be a basecoat, a clearcoat or both. Most preferably, the coating compositions of the invention will serve as a clearcoat and a repair coating for clearcoats.

When used as a clearcoat, the compositions of the invention will normally be applied over a pigmented basecoat composition and most preferably a water borne basecoat composition such as is described in U.S. Re. 34,730, hereby incorporated by reference. Other pigmented basecoat compositions for such composite coatings are well known in the art, and do not require explanation in detail herein. Polymers known in the art to be useful in basecoat compositions include acrylics, vinyls, polyurethanes, polycarbonates, polyesters, alkyds, and polysiloxanes. A preferred polymer is an acrylic polymer.

Coating compositions can be coated on the article by any of a number of techniques well known in the art. These include, for example, spray coating, dip coating, roll coating, curtain coating, and the like. For automotive body panels, spray coating is preferred.

After application, the coating composition of the invention is subjected to conditions sufficient to provide a cured film. Typically, the coated substrate is subjected to exposure to a radiative heat source for a period of time such that the crosslinking reaction of film forming component (a) is initiated and completed. Curing temperatures will vary depending on the composition of the applied coatings, however they generally range between about 200° F./93° C. and 395° F./201° C., preferably between 240° F./116° C. and 350° F./177° C., and most preferably between 250° F./121° C. and 286° F./141° C. The curing time will vary depending on the particular components used and physical parameters such as the thickness of the layers, however, typical curing times range from 15 to 60 minutes.

The method of the invention improves the adhesion of a repair coating to a coated substrate. Repair coatings applied to the coated substrate resulting from the application of the coating composition of the invention may be those applied in in-line repair processes, end of line repair processes as well as refinish processes. However, significant improvements in adhesion are achieved when the repair coating is that typically applied in an in-line repair process, i.e., the repair coating is the same as the coating previously applied. Although other types of repair coatings that are known in the art may be applied, a preferred type of repair coating is the coating composition of the invention.

After application of the repair coating it is subjected to conditions sufficient to effect cure. In the most preferred case, the repair coating will be cured as indicated for the coating composition of the invention.

The invention is further described in the following non-limiting examples.

EXAMPLES

Examples 2–4 are based on URECLEAR® clearcoat[1] prepared without catalyst and were prepared by adding the identified materials to the clearcoat under agitation.

---
[1] A commercial clearcoat available from BASF Corporation as R10CG060F.

TABLE 1

| Material | Control (g) | Example 2 (g) | Example 3 (g) | Example 4 (g) | Example 5 (g) |
|---|---|---|---|---|---|
| R10CG060F | 1407.5 | | | | |
| R10CG060F without catalyst | | 1407.5 | 1407.5 | 1407.5 | 1407.5 |
| Blocked DDBSA[2] | | 28.0 | 25.6 | | |
| FC4800[3] | | | 12.0 | | |
| DBTDA[4] | | 16.8 | | 11.2 | 2.8 |
| isobutanol | | | 7.2 | 16.8 | |

[2]Blocked DDBSA is 25% active DDBSA and is available from King Industries (Norwalk, CT) as Nacure XC6206.
[3]FC4800 is 40% w/w of Fascat 4800 in N-methylpyrrolidone. Fascat 4800 is commercially available from Elf-Atochem of Philadelphia, PA.
[4]100% dibutyltindiacetate Test panels for Adhesion test #1 were prepared by spray coating electrocoated steel panels with approximately 0.8 mil of black basecoat (E86KE524 Ebony Black from BASF Corp.). After 5–20 minutes, the clearcoat samples from Table 1 above were spray applied to 1.8–2.0 mil. After 5–20 minutes, the panels were baked for 10 minutes (time at metal temperature) at 250° F. After cooling, a repair topcoat of 0.4 mil spray applied black basecoat (E86KE524 Ebony Black from BASF Corp) was applied. No sanding or surface preparation was performed prior to the application of the repair coating. 5 to 20 minutes after the application of the repair coating, the clearcoat samples from Table 1 were spray applied to 1.8–2.0 mil. After 5–20 minutes, the resulting panels were baked for 10 minutes (time at metal temperature) at 250° F.

Test panels for Adhesion test #2 were prepared as for Adhesion test #1, except however, that after the first application of the samples from Table 1, the panels were baked for 50 minutes (time at metal temperature) at 295° F. After the application of the repair composite coating, the panels were baked at 11 minutes (time at metal temperature) at 260° F.

Test panels for the appearance evaluation were prepared as indicated for Adhesion test #1, except however, after the application of the samples from Table 1, the panels were baked for 20 minutes (time at metal temperature) at 270° F. and no repair composite coating was applied.

TABLE 2

| Test | Control | Example 2 | Example 3 | Example 4 | Example 5 |
|---|---|---|---|---|---|
| Stability #4 Ford Cup (sec) | 4.0 | 24.7 | 11.5 | 0.6 | 8.5 |
| Adhesion #1 | 100% | 0 | 0 | No cure | 0 |
| Adhesion #2 | 0 | 10% | 0 | | 0 |
| Appearance | 66.0 | 53.7 | 70.4 | | 66.9 |

Stability reflects the viscosity difference between the initial sample and that of a sample exposed to 140° F. Viscosity units are seconds on a #4 Ford cup.

The values for Adhesion tests #1 and #2 reflect percent pickoff of repair topcoating from original topcoating. The panels were cut with a 2 mm crosshatch and pulled at a 45 angle with Scotch® tape 810 cellophane tape.

The value reported for Appearance is measured from a panel using an Autospect® instrument. This is a composite of gloss, distinctness of image and orange peel (Ford composite). Higher numbers are better.

A review of the results in Table 2 indicates that the samples prepared according to the method of the invention, i.e., Examples 3 and 5, show an improvement in the overall balance of properties.

We claim:

1. A method for improving the adhesion of a repair coating to a coated substrate, comprising:
    applying to a substrate at least one coating composition comprising
        (a) film forming component comprising
            (i) a crosslinking component comprising one or more aminoplast resins, and
            (ii) one or more polymers having one or more functional groups which are reactive with the crosslinking component,
        (b) an adhesion improving additive comprising one or more compounds containing Sn(IV),
        (c) a catalyst for promoting a reaction between crosslinking agent (i) and polymer (ii),
    curing the at least one coating composition to provide a coated substrate, and
    applying one or more repair coatings to the coated substrate.

2. The method of claim 1 wherein the one or more repair coatings are the same as the at least one coating composition.

3. The method of claim 1 wherein the film forming component comprises (ii) one or more carbamate functional polymers.

4. The method of claim 1 wherein the adhesion improving additive (b) comprises one or more compounds selected from the group consisting of compounds having the formula

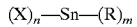

where m, n=1 to 3, m+n=4 or 5, X is an at least $C_1$ alkyl group, and R is a conjugate base of an acid, or

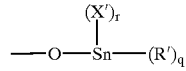

wherein q=0 to 2, r=1 to 3, r+p=3 or 4, X' is selected from X, and R' is selected from R.

5. The method of claim 4 wherein additive (b) is selected from the group consisting of compounds having the formula

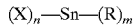

wherein m, n=1 to 3, m+n=4, X is a $C_{1-16}$ alkyl group, and R is a conjugate base of an acid selected from the group consisting of water, alcohols, carboxylic acids, phosphoric acid, alkyl or aryl mono or diacidphosphates, alkyl or aryl phosphonates, alkyl or aryl sulfonates, alkyl or aryl sulfates, and mixtures thereof.

6. The method of claim 5 wherein the acid is selected from the group consisting of acetic acid, alkyl substitued sulfonic acids, aryl substituted sulfonic acids and mixtures thereof.

7. The method of claim 5 wherein the additive (b) is dibutyltindiacetate.

8. The method of claim 1 wherein the catalyst (c) is an at least partially blocked acid catalyst.

9. The method of claim 1 wherein the at least one coating further comprises
    (d) an adhesion promoting component consisting of
        (i) an epoxy group containing component, and
        (ii) a monofunctional carboxy group component.

10. A coating composition having improved adhesion to repair coatings, said coating composition comprising:

(a) a film-forming component consisting of
  (i) a crosslinking component consisting of one or more aminoplast resins, and
  (ii) one or more polymers having one or more functional groups which are reactive with the one or more aminoplast resins,
(b) an adhesion improving additive comprising one or more compounds containing Sn(IV), and
(c) a catalyst for promoting a reaction between the one or more aminoplast resins (i) and one or more polymers (ii), the catalyst comprising one or more acidic compounds which are at least partially blocked.

11. The composition of claim 10 further comprising
(d) an adhesion promoting component consisting of
  (i) an epoxy group containing component, and
  (ii) a monofunctional carboxy group component.

12. A coated article comprising
an article having a substrate with a cured coating thereon, the cured coating comprising the result of curing at least one coating composition comprising
  (a) a film-forming component consisting of
    (i) a crosslinking agent consisting of one or more aminoplast resins, and
    (ii) one or more polymers having one or more functional groups which are reactive with the one or more aminoplast resins,
  (b) an adhesion improving additive comprising one or more compounds containing Sn(IV),
  (c) a catalyst for promoting a reaction between crosslinking agent (i) and one or more polymers (ii), comprising one or more acidic compounds which are at least partially blocked.

13. The coated article of claim 12 further comprising a repair coating applied to at least a portion of the cured coating.

14. The coated article of claim 12 wherein the at least one coating composition further comprises
  (d) an adhesion promoting component consisting of
    (i) an epoxy group containing component, and
    (ii) a monofunctional carboxy group component.

15. The coated article of claim 13 wherein the repair coating applied to at least a portion of the cured coating is the same as the at least one coating composition.

16. A method for improving the adhesion of a repair coating to a coated substrate, comprising:
applying to a substrate at least one coating composition comprising
  (a) a film-forming component consisting of
    (i) one or more aminoplast resins, and
    (ii) one or more polymers having one or more functional groups which are reactive with the one or more aminoplast resins,
  (b) an adhesion improving additive comprising one or more compounds containing Sn(IV),
  (c) a catalyst for promoting a reaction between one or more aminoplast resins
    (i) and one or more polymers (ii), comprising one or more acidic compounds which are at least partially blocked, and
curing the at least one coating composition to provide a coated substrate, and
applying one or more repair coatings to the coated substrate.

* * * * *